United States Patent
Quan et al.

(10) Patent No.: US 9,786,232 B2
(45) Date of Patent: Oct. 10, 2017

(54) 2D/3D SWITCHABLE STEREOSCOPIC DISPLAY DEVICE

(71) Applicant: SuperD Co. Ltd., Shenzhen (CN)

(72) Inventors: Hongwei Quan, Shenzhen (CN); Jiajia Pi, Shenzhen (CN); Fuzhong Guo, Shenzhen (CN); Xiaoda Gong, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 77 days.

(21) Appl. No.: 14/831,458

(22) Filed: Aug. 20, 2015

(65) Prior Publication Data

US 2016/0065950 A1    Mar. 3, 2016

(30) Foreign Application Priority Data

Sep. 2, 2014  (CN) .......................... 2014 1 0444490
Jul. 9, 2015  (CN) .......................... 2015 1 0402058

(51) Int. Cl.
*H04N 13/04* (2006.01)
*G09G 3/36* (2006.01)
(Continued)

(52) U.S. Cl.
CPC ........... *G09G 3/36* (2013.01); *G02B 27/2214* (2013.01); *G02F 1/1339* (2013.01); *G02F 1/13306* (2013.01); *G02F 1/292* (2013.01); *H04N 13/0404* (2013.01); *H04N 13/0452* (2013.01); *G02F 2001/13398* (2013.01)

(58) Field of Classification Search
CPC .............................. G09G 3/36; G02F 1/13306
See application file for complete search history.

(56) References Cited

U.S. PATENT DOCUMENTS

| 6,864,931 B1 * | 3/2005 | Kumar ................. G02B 3/0006 349/188 |
| 2010/0026920 A1 * | 2/2010 | Kim .................... H04N 13/0404 349/15 |

(Continued)

FOREIGN PATENT DOCUMENTS

| JP | 2010525388 A | 7/2010 |
| JP | 2010249954 A | 11/2010 |

(Continued)

*Primary Examiner* — Sang V Nguyen
(74) *Attorney, Agent, or Firm* — Anova Law Group, PLLC

(57) ABSTRACT

A stereoscopic display device includes a display panel for displaying 2D/3D images, a driving circuit module, and a light-splitting device. The light-splitting device includes a first substrate having a plurality of first electrodes, a second substrate arranged facing the first substrate and having at least one second electrode, a liquid crystal layer placed between the first substrate and the second substrate, and a plurality of spacers in the liquid crystal layer. The driving circuit module is configured to, when in the 3D display mode, provide a plurality of driving voltages between the first electrodes and the second electrode to make the liquid crystal layer an array of liquid crystal lenses and, when in the 2D display mode, to provide a deflection voltage between the first electrodes and the second electrode to reduce a refractive index difference between the liquid crystal molecules and the spacers with a predetermined range.

17 Claims, 8 Drawing Sheets

(51) Int. Cl.
G02F 1/133 (2006.01)
G02F 1/1339 (2006.01)
G02F 1/29 (2006.01)
G02B 27/22 (2006.01)

(56) References Cited

U.S. PATENT DOCUMENTS

| | | | | |
|---|---|---|---|---|
| 2010/0157181 A1* | 6/2010 | Takahashi | ........... | G02B 27/2214 349/33 |
| 2011/0032438 A1* | 2/2011 | Yun | ..................... | G02F 1/13471 349/15 |
| 2011/0084961 A1* | 4/2011 | Son | ................... | G02B 27/2242 345/419 |
| 2011/0310320 A1* | 12/2011 | Takahashi | ................. | G02F 1/29 349/33 |
| 2012/0120333 A1* | 5/2012 | Chen | ........................ | G02B 3/14 349/33 |
| 2012/0218490 A1* | 8/2012 | Takama | ................. | G02B 3/005 349/57 |
| 2013/0208196 A1* | 8/2013 | Kim | .................. | G02F 1/134309 349/15 |

FOREIGN PATENT DOCUMENTS

| | | | | |
|---|---|---|---|---|
| JP | 2012003072 A | 1/2012 | | |
| JP | 201227489 A | 2/2012 | | |
| JP | 2012-141552 | * | 7/2012 | ............... G02F 1/13 |
| JP | 2012141552 A | 7/2012 | | |
| JP | 2012173715 A | 9/2012 | | |
| KR | 101419230 B1 | 7/2014 | | |

* cited by examiner

2D/3D SWITCHABLE STEREOSCOPIC DISPLAY DEVICE

CROSS-REFERENCES TO RELATED APPLICATIONS

This application claims the priority of Chinese patent application No. CN201410444490.4, filed on Sep. 2, 2014, and Chinese patent application No. CN201510402058.3, filed on Jul. 9, 2015, the entire contents of all of which are incorporated herein by reference.

FIELD OF THE DISCLOSURE

The present disclosure generally relates to the field of display technologies and, more particularly, relates to a 2D/3D switchable stereoscopic display device.

BACKGROUND

As the stereoscopic display technology gets widely used, the stereoscopic display devices are required not only able to display three-dimensional images (3D), but also able to display two-dimensional images (2D), e.g., text and pictures, at the viewer's discretion. As shown in FIG. 1, a conventional stereoscopic display device includes a display panel 2' and a plurality of liquid crystal lenses 1' disposed on the light emitting side of the display panel 2'. The display panel 2' provides a left view image and a right view image with a parallax between the two images. Separated by the liquid crystal lenses, the left view image is presented to viewer's left eye and the right view image is presented to viewer's right eye. The viewer's brain forms the 3D image by perceiving the parallax between the two images.

As shown in FIGS. 1 and 2, the liquid crystal lenses 1' include a first substrate 11' and a second substrate 12' facing each other. A liquid crystal layer are sandwiched between the first substrate 11' and the second substrate 12' and a plurality of spacers 14' are placed between the first substrate 11' and the second substrate 12' to support the thickness of the liquid crystal layer. A plurality of first electrodes 15' is disposed in parallel with each other on the first substrate 11'. Adjacent first electrodes 15' are separated by a certain distance. A plurality of second electrodes 16' is disposed in parallel with each other on the second substrate 12'. Adjacent second electrodes 16' are also separated by a certain distance.

A plurality of first voltages and a plurality of second voltages are supplied to the first electrodes 15' and the second electrodes 16' respectively. The differences between the first voltages and the second voltages produce the driving electric field between the first substrate 11' and the second substrate 12', driving the liquid crystal molecules 13' in the liquid crystal layer to rotate at various angles. As such, a plurality of liquid crystal lens units 17' is formed and arranged in array between the first substrate 11' and the second substrate 12'. The plurality of liquid crystal lens units 17' separates the polarized light emitted from the display panel 2' into a left view image to be viewed by viewer's left eye and a right view image to be viewed by viewer's right eye. Thus, the stereoscopic display effect is achieved.

As shown in FIG. 3, when the stereoscopic display device 600 is used to display 2D images, the voltages supplied to the liquid crystal lenses 1' are cut off. As such, no electric field is produced between the first substrate 11' and the second substrate 12'. Due to the substantial difference in refractive index between the spacers 14' and the liquid crystal molecules 13', the polarized light emitted from the display panel 2' is refracted when passing through the spacers 14', causing bright spots surrounding the spacers 14' visible to viewer's eyes. Such bright spots may impact the viewing experience and cause discomfort to the viewer's eyes.

Another type conventional stereoscopic display device includes a display panel and a liquid crystal lens grating. The display panel includes a plurality of pixel units and a plurality of black matrices configured among the pixel units. The liquid crystal lens grating includes a plurality of liquid crystal lenses and a plurality of spacers positioned corresponding to the positions of the black matrices on the display panel. However, such black matrices on the display panel may affect the display effect. In addition, the black matrices may be unable to completely cover the spacers and the bright spots surrounding the spacers can still be visible to viewer's eyes.

The disclosed stereoscopic display device is directed to solve one or more problems set forth above and other problems in the art.

BRIEF SUMMARY OF THE DISCLOSURE

One aspect of the present disclosure provides stereoscopic display device. The stereoscopic display device includes a display panel for displaying 2D images and 3D images, a driving circuit module, and a light-splitting device. The light-splitting device is coupled to the display panel to separate light emitted from the display panel displaying the 3D images to effect 3D display effect in a 3D display mode and to pass through light emitted from the display panel in a 2D display mode. The light-splitting device includes a first substrate having a plurality of first electrodes, a second substrate arranged facing the first substrate and having at least one second electrode, a liquid crystal layer placed between the first substrate and the second substrate and containing liquid crystal molecules, and a plurality of spacers placed between the first substrate and the second substrate and in the liquid crystal layer to support a thickness of the liquid crystal layer. The driving circuit module is configured to, when in the 3D display mode, provide a plurality of driving voltages between the first electrodes and the second electrode to make the liquid crystal layer an array of liquid crystal lenses and, when in the 2D display mode, to provide a deflection voltage between the first electrodes and the second electrode to reduce a refractive index difference between the liquid crystal molecules and the spacers with a predetermined range.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 6:
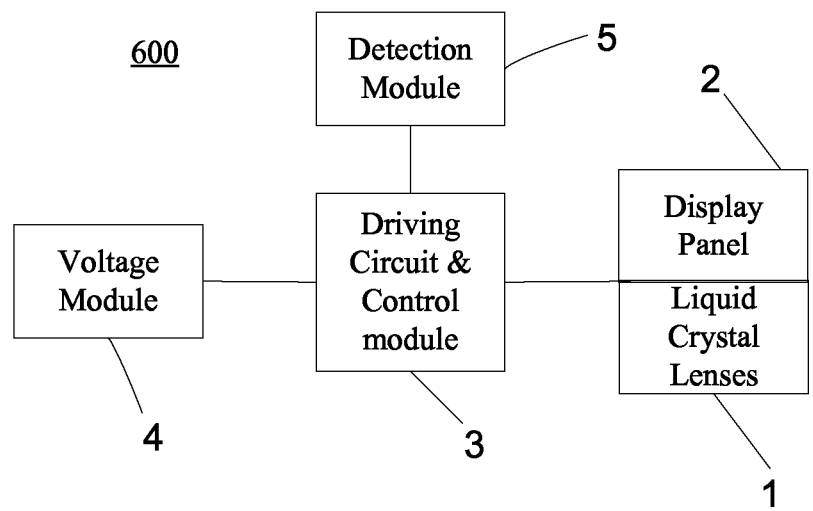
FIG. 6 illustrates another exemplary stereoscopic display device consistent with disclosed embodiments.

FIG. 6 illustrates an exemplary 2D/3D switchable stereoscopic display device consistent with the disclosed embodiments. As shown in FIG. 6, stereoscopic display device 600 includes liquid crystal lenses 1, a display panel 2, a driving circuit and control module 3, a voltage module 4, and a detection module 5. Certain component may be omitted and other components may be added.

The display panel 2 may include any appropriate type of display panel for displaying images, such as flat panel display or other type of display. For example, the display panel 2 may be a liquid crystal display (LCD) panel, a plasma panel display, an organic light-emitting diode (OLED) display panel, etc.

The liquid crystal lenses 1 may be a type of light-splitting device for separating lights emitted from the display panel 2 when displaying 3D view images to effect 3D display to a viewer. The liquid crystal lenses 1 may be coupled with the display panel 2 to process the light emitted from the display panel 2 to effect 3D display or to effect 2D/3D switchable display.

Figure 15:
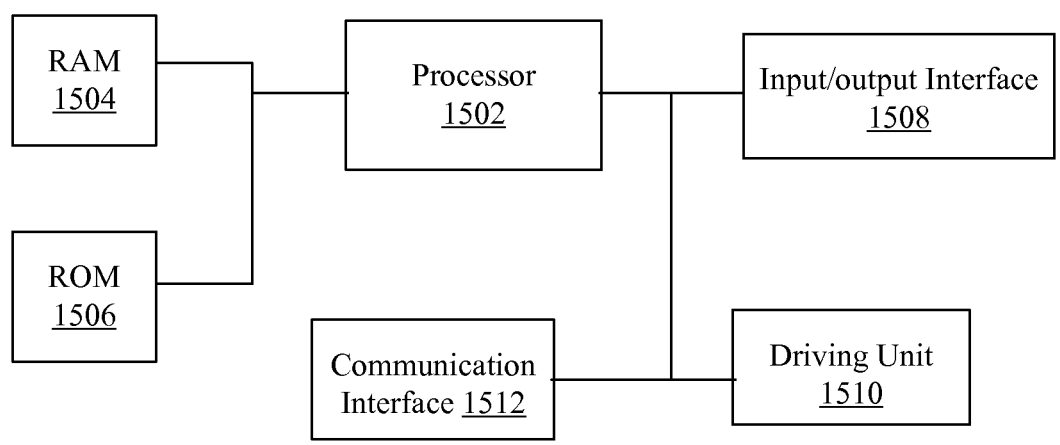
FIG. 15 illustrates an exemplary control module consistent with disclosed embodiments.

The driving circuit and control module 3 may be configured to provide driving circuit for the display panel 2 and/or the liquid crystal lenses 1, and also to provide control functions for the stereoscopic display device 600. FIG. 15 illustrates an exemplary driving circuit and control module.

As shown in FIG. 15, the driving circuit and control module 3 may include a processor 1502, a random access memory (RAM) unit 1504, a read-only memory (ROM) unit 1506, an input/output interface unit 1508, a driving unit 1510, and a communication interface 1512. Other components may be added and certain devices may be removed without departing from the principles of the disclosed embodiments. For illustrative purposes, the driving circuit and control module 3 may be referred as a driving circuit or control module.

Processor 1502 may include any appropriate type of graphic processing unit (GPU), general-purpose microprocessor, digital signal processor (DSP) or microcontroller, and application specific integrated circuit (ASIC), etc. Processor 1502 may execute sequences of computer program instructions to perform various processes associated with the display apparatus. The computer program instructions may be loaded into RAM 1504 for execution by processor 1502 from read-only memory 1506 to process various 3D images.

Input/output interface 1508 may be provided for users to input information into the display apparatus or for the users to receive information from the display apparatus. For example, input/output interface 1508 may include any appropriate input device, such as a remote control, a keyboard, a mouse, an electronic tablet, a voice communication device, or any other optical or wireless input device. Further, driving unit 1510 may include any appropriate driving circuitry to drive various devices, such as the various electrodes.

Further, communication interface 1512 may provide communication connections such that control module 3 may be accessed by and/or communicate with other processors or systems through computer networks or other communication links via various communication protocols, such as transmission control protocol/internet protocol (TCP/IP) and hypertext transfer protocol (HTTP).

Further, the voltage module 4 may provide various voltages for driving the liquid crystal lenses 1 and/or the display panel 2. The voltage module 4 may also provide voltage for other components of the stereoscopic display device 600.

The detection module 5 may provide various environment parameters to the stereoscopic display device 600 or, particularly to the driving circuit and control module 3. For example, the detection module 5 may provide position, range, and movement information of a viewer or user, or may provide other parameters, such as ambient light, etc.

Figure 4:
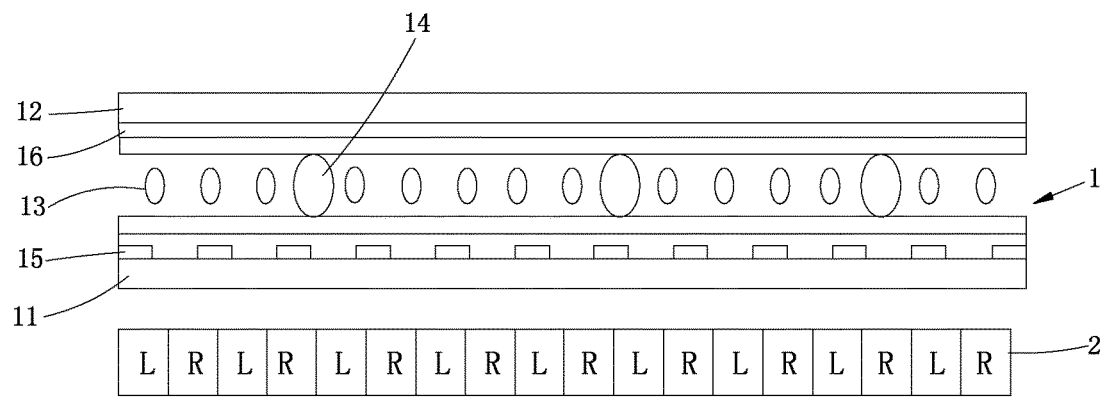
FIG. 4 illustrates an exemplary stereoscopic display device when displaying 2D images consistent with disclosed embodiments.
Figure 5:
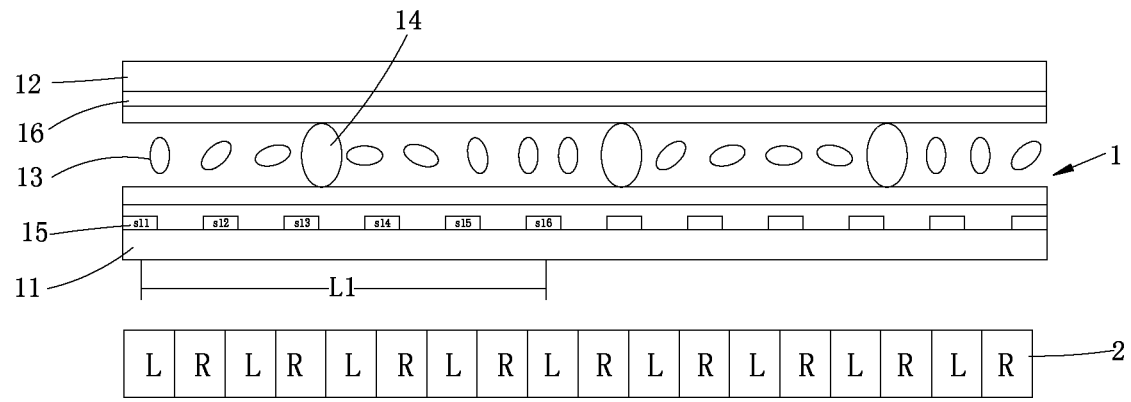
FIG. 5 illustrates an exemplary stereoscopic display device when displaying 3D images consistent with disclosed embodiments.

During operation, the various components may interact with one another to implement 3D display functionalities of the stereoscopic display device 600. FIG. 4 and FIG. 5 illustrate operation of the display panel 2 and the liquid crystal lenses 1 under the control of the driving circuit.

As shown in FIG. 4, the display panel 2 emits light for displaying images. The display panel 2 may include pixels arranged in an array. L indicates the pixel emitting light intended for left view image and R indicates the pixel emitting light intended for right view image, and the left view image and the right view image are viewed by the left eye and the right eye of the viewer, respectively.

Also shown in FIG. 4, the liquid crystal lenses 1 are disposed on the display side of the display panel 2. The liquid crystal lenses 1 include a first substrate 11 and a second substrate 12, facing towards each other. The second substrate 12 is disposed on top of the first substrate 11. A liquid crystal layer (not labeled) is sandwiched between the first substrate 11 and the second substrate 12. A plurality of spacers 14 are placed in the liquid crystal layer to support the thickness of the liquid crystal layer. A plurality of first electrodes 15 is configured on the first substrate 11. A plurality of second electrodes 16 is configured on the second substrate 12. The first electrodes 15 and the second electrodes 16 are electrically connected to the outputs of the driving circuit 3.

In one embodiment, each of the first electrodes 15 disposed on the first substrate 11 is extended in the same direction and in parallel with each other. Any two adjacent first electrodes 15 are separated by a certain distance. Specially, the first electrodes 15 may be strip shaped electrodes. And any appropriate shape may be used for the first electrodes 15.

In another embodiment, each of the second electrodes 16 disposed on the second substrate 12 is extended in the same direction and in parallel with each other. Any two adjacent second electrodes 16 are separated by a certain distance. The second electrodes 16 may be strip shaped electrodes. The driving circuit 3 may supply common voltages or the ground to the second electrodes 16. In further another embodiment, the second electrodes 16 may also be plane shaped electrode, i.e., a single plate electrode, in which case the second electrodes 16 may just be a single plane-shaped electrode. Any appropriate shape may be used for the second electrodes 16.

When the liquid crystal lenses 1 are used to display 3D images, the driving circuit 3 supplies driving voltages to the first electrodes 15 and supplies common voltages or ground voltages to the second electrodes 16. The differences between the driving voltages and the common voltages form the electric field between the first substrate 11 and the second substrate 12. Driven by the electric field, the liquid crystal molecules 13 rotate to realize lens effect.

As shown in FIG. 5, when the stereoscopic display device 600 is used to display 3D images, the voltage module 4 supplies an initial voltage to the driving circuit 3. The driving circuit 3 converts the initial voltage to produce a plurality of driving voltage outputs required by the operation of the liquid crystal lenses 1. Driven by the driving voltage outputs, the liquid crystal molecules 13 in the liquid crystal layer form a plurality of liquid crystal lens units L1 having refractive index gradient. The plurality of the liquid crystal lens units L1 are arranged in an array of lens units to separate the polarized light emitted from the display panel 2 to produce the stereoscopic images, i.e., a 3D display mode.

To form the liquid crystal lens units L1 having refractive index gradient, the driving voltages must be symmetrically distributed with respect to the center of each liquid crystal lens unit L1. The values of the driving voltage outputs gradually decrease from both sides to the center of the liquid crystal lens unit. In one embodiment, in the converting of the initial voltage to produce a plurality of driving voltage outputs required by the operation of the liquid crystal lenses 1, the driving circuit 3 switches and/or adjusts the initial voltage to generate the plurality of driving voltage outputs. For illustrative purposes, the driving circuit 3 switching the initial voltage is used in examples. However, the driving circuit 3 can similarly adjusting the initial voltage to generate the plurality of driving voltage outputs.

In one embodiment, the initial voltage may be equal to or greater than the maximum driving voltage for the liquid crystal lenses 1. When the stereoscopic display device 600 is used to display 3D images, the driving circuit 3 converts the initial voltage to produce the driving voltage outputs required by the operation of the liquid crystal lenses 1. The driving voltage outputs make the liquid crystal molecules 13 rotate to form a plurality of liquid crystal lens units L1 having refractive index gradient. The polarized light emitted from the display panel 2 is separated by the liquid crystal lenses 1 to form the left view and right view images with parallax between them, which are perceived by the viewer as 3D images.

Returning to FIG. 4, when the stereoscopic display device 600 is used to display 2D images, the driving circuit 3 converts the initial voltage to produce a plurality of deflection voltage outputs. The deflection voltage output is greater than the threshold voltage of the liquid crystal molecules 13, but is less than or equal to the initial voltage. The deflection voltage output may be uniformly applied on all first electrodes 15 or second electrode 16 to makes the liquid crystal molecules 13 rotate uniformly, which means the liquid crystal lens units L1 are not formed to separate light emitted from the display panel 2, i.e., a 2D display mode.

The rotation changes the refractive indices of the liquid crystal molecules 13 with respect to the polarized light emitted from the display panel 2, reduces the difference in refractive index between the liquid crystal molecules 13 and the spacers 14, and hence eliminates the bright spots surrounding the spacers 14 when the polarized light emitted from the display panel 2 passes through the spacers 14.

In one embodiment, the difference in refractive index between the liquid crystal molecules 13 and the spacers 14 is small enough to fall within a predetermined range. In certain embodiments, the predetermined range refers to the difference in refractive index between the liquid crystal molecules 13 and the spacers 14, which may be less than 0.1. Other values may also be applicable, and the predetermined range may be configured as needed. The reduction of the difference in refractive index between the liquid crystal molecules 13 and the spacers 14 improves the image clarity and viewing experience when 2D images are displayed by the disclosed stereoscopic display device 600.

Figure 1:
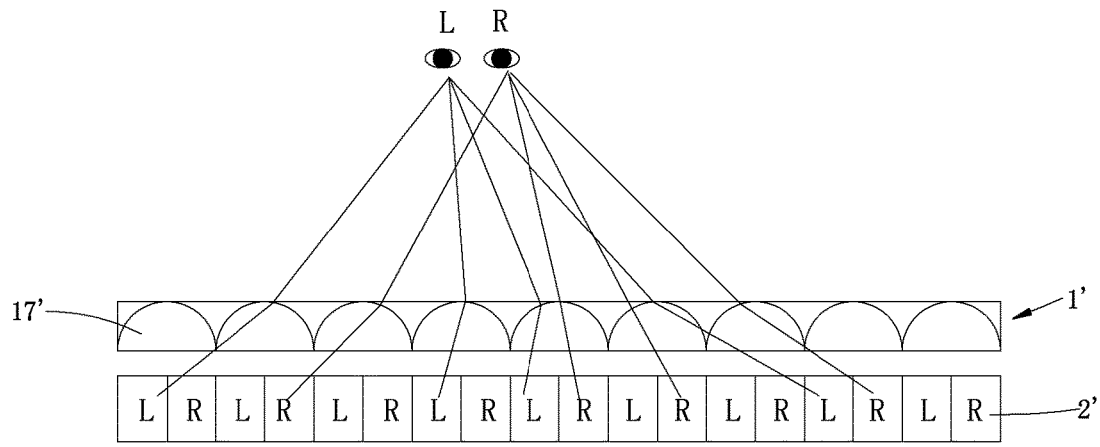
FIG. 1 illustrates a schematic view of a conventional 2D/3D switchable stereoscopic display device.
Figure 2:
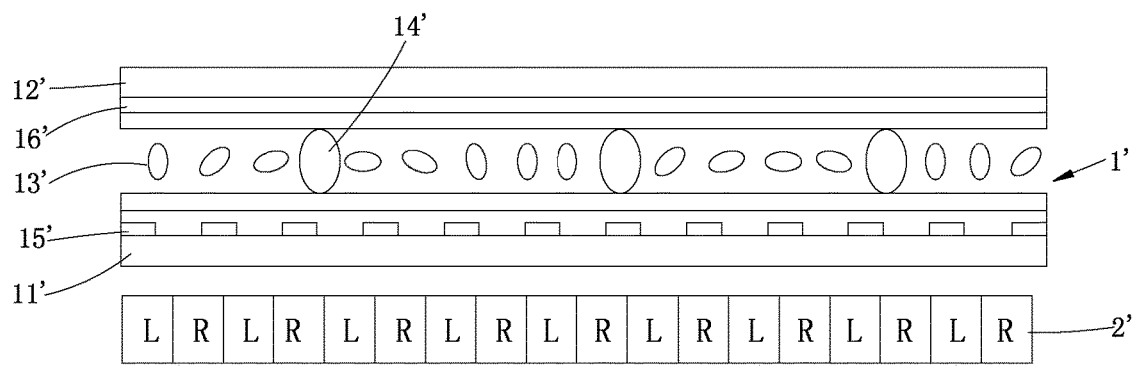
FIG. 2 illustrates a schematic view of the liquid crystal lenses in FIG. 1.
Figure 3:
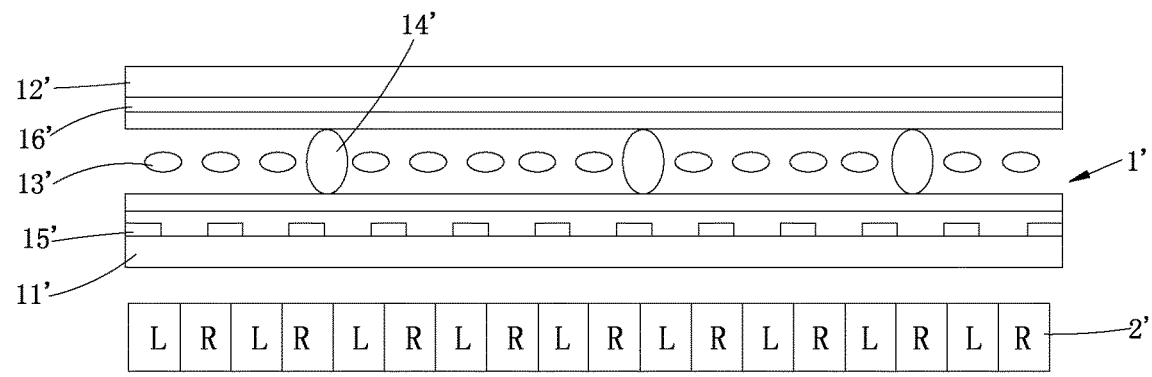
FIG. 3 illustrates another schematic view of the liquid crystal lenses in FIG. 1.

Thus, the disclosed embodiments may solve the problem in the conventional stereoscopic display device as shown in FIG. 3, where the driving voltages are cut off from the liquid crystal lenses 1 when the stereoscopic display device is displaying 2D images, causing substantial difference in refractive index between the liquid crystal molecules 13' and the spacers 14' and subsequently bright spots surrounding the spacers 14' due to the refraction of the light emitted from the display panel 2'.

Further, according to disclosed embodiments, because of the substantially small difference in refractive index between the liquid crystal molecules 13 and the spacers 14, the positions of the spacers 14 might not be required to correspond to the positions of the black matrices disposed in the display panel 2. Thus, the manufacturing complexity of the liquid crystal lenses 1 is reduced. Further, in certain embodiments, the driving circuit 3 is simple and does not incur additional cost to the stereoscopic display device 600.

Figure 7:
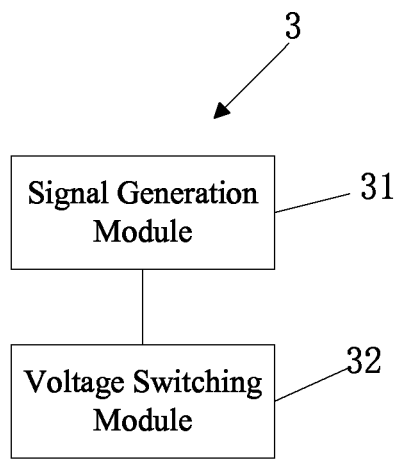
FIG. 7 illustrates a block diagram of an exemplary driving circuit consistent with disclosed embodiments.

FIG. 7 illustrates an exemplary driving circuit 3 consistent with the disclosed embodiments. As shown in FIG. 7, the driving circuit 3 includes a signal generation module 31 and a voltage switching module 32. When the stereoscopic display device 600 is used to display 2D images, the signal generation module 31 produces a control signal to control the voltage switching module 32 to switch driving voltages to deflection voltages.

The signal generation module 31 and the voltage switching module 32 are electrically connected. The voltage switching module 32 switches the driving circuit 3 output voltages between the driving voltages and the deflection voltages, depending on the image display mode. Because the deflection voltages are greater than the threshold voltage of the liquid crystal molecules 13, the liquid crystal molecules 13 rotate such that the differences in refractive index between the liquid crystal molecules 13 and the spacers 14 are reduced and the effect of the spacers 14 on the light emitted from the display panel 2 is minimized. When the difference in refractive index between the liquid crystal molecules 13 and the spacers 14 falls within a predetermined range, the effect of the spacers 14 on polarized light emitted from the display panel 2 is minimized, improving the image clarity and viewing experience when the stereoscopic display device 600 is used to display 2D images.

In certain embodiments, controlled by the control signal produced by the signal generation module 31, the voltage switching module 32 switches the driving voltages to the deflection voltages for the liquid crystal lenses 1. Thus, the disclosed embodiments provide the benefits of fast response of the liquid crystal lenses 1, improved viewing experience, simple control circuit, no excessive component cost, and ease of operation.

Figure 8:
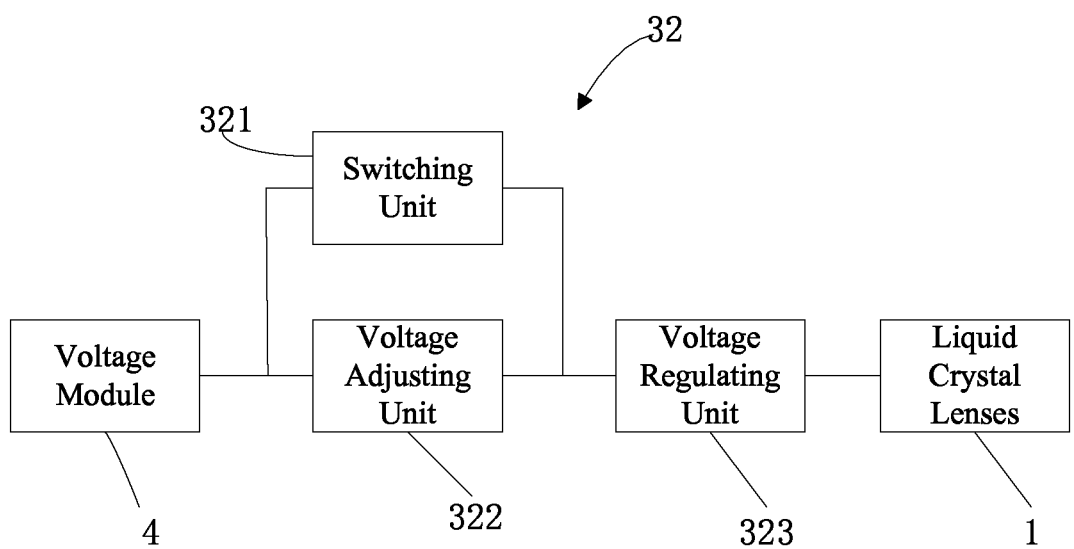
FIG. 8 illustrates a block diagram of an exemplary voltage switching module consistent with disclosed embodiments.

As a further improvement shown in FIG. 8, the voltage switching module 32 may include a switching unit 321, a voltage adjusting unit 322 and a voltage regulating unit 323.

The switching unit 321 receives the control signal from the signal generation module 31 and switches the output voltages of the voltage switching module 32 between the driving voltages and the deflection voltages. The switching unit 321 is electrically connected to the signal generation module 31.

The switching unit 321 may be binary flip-flops. When the control signal is 1, the switching unit 321 closes. When the control signal is 0, the switching unit 321 opens. Specifically, when the stereoscopic display device 600 is used to display 3D images, the control signal is 0, the switching unit 321 opens, and the driving circuit 3 converts the initial voltage to produce the driving voltages to make the liquid crystal molecules 13 rotate to form the liquid crystal lens units L1. When the stereoscopic display device 600 is used to display 2D images, the control signal is 1, the switching unit 321 closes to switch the driving voltages to the deflection voltages. The control signal is used to control the voltage switching to increase the reliability of the switching unit 321.

As shown in FIG. 8, the voltage switching module 32 may also include a voltage adjusting unit 322. The output of the voltage module 4 feeds into the voltage adjusting unit 322. The voltage adjusting unit 322 adjusts the output voltage from the voltage module to produce the driving voltages. The voltage adjusting unit 322 may be adjustable resistors. The voltage adjusting unit 322 electrically connects in parallel with the switching unit 321.

When the switching unit 321 closes, the voltage adjusting unit 322 is short-circuited and the driving voltages are switched to the deflection voltage. When the switching unit 321 opens, the voltage adjusting unit 322 produces the driving voltages by setting the adjustable resistor values. Controlled by the control signal, the switching unit 321 opens and closes accordingly. No manual operation is required by the viewer. Thus, the operation of the stereoscopic display device 600 is simplified. The automatic switching between 2D and 3D image display modes to satisfy the viewer's needs improves the viewing experience.

As shown in FIG. 8, the voltage switching module 32 may also include a voltage regulating unit 323. The voltage regulating unit 323 is configured to regulate the deflection voltage. The inputs of the voltage regulating unit 323 electrically connect in series to the outputs of the voltage adjusting unit 322. The outputs of the voltage regulating unit 323 electrically connect in series to the first electrodes 15 and the second electrodes 16 respectively. The initial voltage is adjusted by the voltage adjusting unit 322 to produce the driving voltages or is converted to the deflection voltages by the switching unit 321. Either the driving voltages or the deflection voltages fluctuate too significantly in the transient to meet the operational requirement of the liquid crystal lenses 1. The voltage regulating unit 323 is configured to regulate the driving voltages or the deflection voltages to remove the transitional fluctuations. The regulated driving voltages or deflection voltages are able to make the liquid crystal molecules 13 rotate as intended accordingly. Thus, the voltage regulating unit 323 provides the regulated driving voltages or deflection voltages for the proper operation of the liquid crystal lenses 1.

As shown in FIG. 6, the stereoscopic display device 600 may also include a detection module 5. The detection module 5 is configured to detect whether a viewer is present within the viewing range of the stereoscopic display device 600, which may be preconfigured. When no viewer is present within the viewing range, the detection module 5 sends a detection signal. The driving circuit 3 receives the detection signal and sets the stereoscopic display device 600 into 2D image displaying mode.

In one embodiment, the preconfigured viewing range refers to a plurality of discrete suitable viewing distances determined by a plurality of discrete light separation unit widths when the stereoscopic display device 600 is operating under the default (or initially configured) display unit arrangement cycle. Within the preconfigured viewing range, the viewer may have the desired 3D viewing experience of the stereoscopic display device 600.

The detection module 5 may include any appropriate detection devices for detecting movement, distance, etc. For example, the detection module 5 may be a human eye tracking unit including a camera. The human eye tracking unit tracks the viewer's eye movement and range. When no human eye is detected by the human eye tracking unit or when the viewer's eyes are out of the preconfigured viewing range, the detection module 5 sends a detection signal. The driving circuit 3 receives the detection signal and sets the stereoscopic display device 600 into the 2D image display mode.

Optionally, the detection module 5 may include an image recognition unit. When the image recognition unit recognizes 2D images contained in the image data source, the detection module 5 sends a detection signal. The driving circuit 3 receives the detection signal and sets the stereoscopic display device 600 into the 2D image display mode. Thus, the stereoscopic display device 600 is compatible to display both 2D and 3D image data sources and the viewing experience is improved.

As shown in FIG. 6, when the stereoscopic display device 600 is used to display the 3D images, the voltage module 4 triggers the driving circuit 3 to supply the driving voltages to the first electrodes 15 and the ground to the second electrodes 16. The driving voltages produce the gradually changing driving electric fields between the first substrate 11 and the second substrate 12. Driven by the driving electric fields, the liquid crystal molecules 13 rotate according to the changing electric field intensity to form the gradient distribution of refractive index of the liquid crystal layer between the first substrate 11 and the second substrate 12 such that an array of liquid crystal lens units L1 (not shown) is formed to assure that the stereoscopic display device 600 presents the left view and right view images with the parallax between them from the display panel 2 to the viewer to achieve 3D viewing experience.

Specifically, when the stereoscopic display device 600 is used to display 3D images, the symmetric driving voltages are supplied to the first electrodes and the ground is supplied to the second electrodes. The resulting driving electric fields make the liquid crystal molecules 13 rotate to form the liquid crystal lens units L1 which have gradient distribution of refractive index and are arranged in arrays.

As shown in FIG. 5, in a liquid crystal lens unit L1, the symmetric driving voltages are supplied to the strip shaped electrodes S11, S12, S13, S14, S15 and S16, e.g., V(S11)= V(S16)>V(S12)=V(S15)>V(S13)=V(S14), wherein, V(S11)= V(S16)=Vseg$_0$, V(S12)=V(S15)=Vseg$_1$, V(S13)= V(S14)= Vseg$_2$. The driving voltages Vseg$_0$, Vseg$_1$, and Vseg$_2$ forming the liquid crystal lens unit L1 gradually decrease from both ends to the center and maintain the symmetry with respect to the center. Thus, the driving electric field in each liquid crystal lens unit L1 changes smoothly. The polarized light emitted from the display panel 2 is separated by the liquid crystal lenses 1 to present the stereoscopic images to the viewer.

Specifically, as shown in FIGS. 4 and 8, when the stereoscopic display device 600 is used to display 2D images, the switching unit 321 switches the driving voltages Vseg$_1$, Vseg$_2$, etc., to the deflection voltages U$_0$, which produce the deflection electric field between the first substrate 11 and the second substrate 12 to make all liquid crystal molecules 13 in the liquid crystal layer rotate. The rotated liquid crystal molecules 13 have the refractive indices within the predetermined range as compared to the refractive index of the spacers 14.

The predetermined range refers to that the difference in refractive index between the liquid crystal molecules 13 and the spacers 14 is less than 0.1. The disclosed embodiments may solve the problem in the conventional technology. As shown in FIG. 3, when the stereoscopic display device is used to display 2D images, no voltage is supplied to the liquid crystal lenses 1' and hence no electric field is applied to the liquid crystal molecules 13', causing substantial difference in refractive index between the liquid crystal molecules 13' and the spacers 14'. The light emitted from the display panel 2' is refracted by the spacers 14'. Bright spots surrounding the spacers 14' are visible to the viewer of the stereoscopic display device. Compared to the conventional technology, the disclosed embodiments may improve the viewing experience and avoids the bright spots when the stereoscopic display device 600 is used to display 2D images.

As shown in FIG. 4, in one embodiment, when the stereoscopic display device 600 is used to display 2D images, the deflection voltages produce a uniform electric field (not shown) between the first substrate 11 and the second substrate 12, which makes all liquid crystal molecules 13 rotate at the same angle. The rotated liquid crystal molecules 13 have the refractive indices within the predetermined range as compared to the refractive index of the spacers 14. The predetermined range refers to that the difference in refractive index between the liquid crystal molecules 13 and the spacers 14 is less than 0.1.

Thus, the light emitted from the display panel 2 is not refracted when passing through the spacers 14. The disclosed embodiments may solve the problem in the conventional technology. As shown in FIG. 3, when the stereoscopic display device is used to display 2D images, no voltage is supplied to the liquid crystal lenses 1' and hence no electric field is applied to the liquid crystal molecules 13', causing substantial difference in refractive index between the liquid crystal molecules 13' and the spacers 14'. The light emitted from the display panel 2' is refracted by the spacers 14'. Bright spots surrounding the spacers 14' are visible to the viewer of the stereoscopic display device. The disclosed embodiments may provide the voltage switching module 32 to switch the driving voltages to the deflection voltages, supplied to form the liquid crystal lenses 1. The deflection voltages produce a uniform deflection electric field between the first substrate 11 and the second substrate 12, which reduces the difference in refractive index between the liquid crystal molecules 13 and the spacers 14 to fall within the predetermined range. Thus, the disclosed embodiments may eliminate the bright spots surrounding the spacers 14 due to the refraction of the light emitted from the display panel 2 while the display quality of the stereoscopic display device 600 is not affected.

The predetermined range refers to that the difference in refractive index between the liquid molecules 13 and the spacers 14, which may be less than 0.1. The deflection electric fields make the liquid crystal molecules 13 rotate to change the refractive indices of the liquid crystal molecules 13 to the light emitted from the display panel 2 and to reduce the difference in refractive index between the liquid crystal molecules 13 and the spacers 14. Thus, the disclosed embodiments may solve the problem in the conventional technology. As shown in FIG. 3, when the stereoscopic display device is used to display 2D images, no voltage is supplied to the liquid crystal lenses 1' and hence no electric field is applied to the liquid crystal molecules 13', causing substantial difference in refractive index between the liquid crystal molecules 13' and the spacers 14'. The light emitted from the display panel 2' is refracted by the spacers 14'. Bright spots surrounding the spacers 14' are visible to the viewer of the stereoscopic display device.

Specifically, as shown in FIGS. 4 and 6, when the stereoscopic display device 600 is used to display 2D images, the voltage module 4 triggers the driving circuit 3 to supply a first voltage or a plurality of similar first voltages to the first electrodes 15 and to supply a second voltage to the second electrodes 16. The differences between the first voltages and the second voltage are the deflection voltages. The deflection voltages produce a uniform deflection electric field. Driven by the uniform deflection electric field, the liquid crystal molecules 13 have the refractive indices fall within the predetermined range as compared to the refractive index of the spacers 14. The difference in refractive index between the liquid crystal molecules 13 and the spacers 14 is reduced. The bright spots surrounding the spacers 14 are eliminated. At the same time, the display quality of the stereoscopic display device 600 is not affected and no light leakage symptom occurs.

Further, as shown in FIG. 4, the first voltages may be equal to the initial voltage. The second voltage may be equal to the ground. The resulting deflection voltages make all liquid crystal molecules 13 in the liquid crystal layer rotate at the same angle such that the proper 2D display effect of the stereoscopic display device 600 is assured.

In one embodiment, the first electrodes 15 and the second electrodes 16 both are strip shaped electrodes. Other shapes of the electrodes, however, may also be used.

Figure 9:
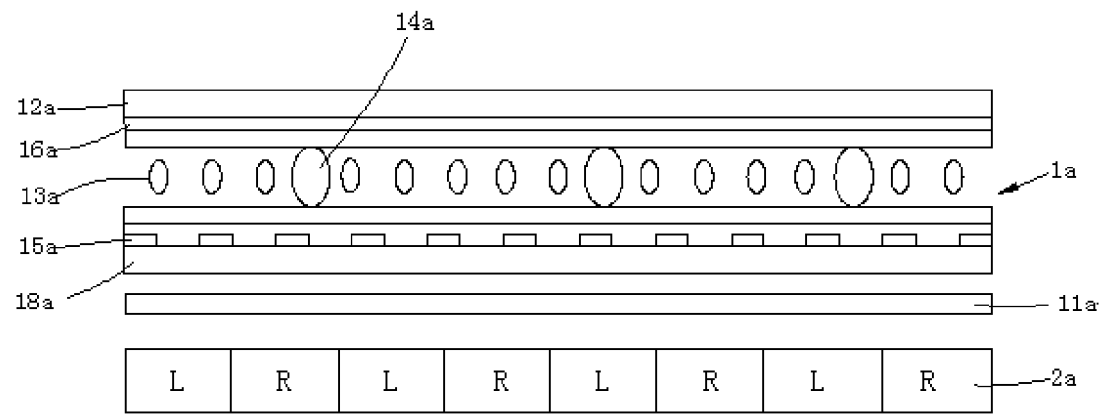
FIG. 9 illustrates another exemplary stereoscopic display device consistent with disclosed embodiments.

FIG. 9 illustrates another exemplary stereoscopic display device. As shown in FIG. 9, the stereoscopic display device may have a structure similar to previous embodiments. In addition, the liquid crystal lenses 1a may also include a plurality of third electrodes 18a. The third electrodes 18a may be are disposed between the first electrodes 15a and the first substrate 11a. An insulating layer (not shown) may be configured between the third electrodes 18a and the first electrodes 15a. That is, the first electrodes 15a may be formed on the insulating layer.

As shown in FIG. 6, when the stereoscopic display device is used to display 2D images, the voltage module 4 may trigger the driving circuit 3 to supply the third voltages to the first electrodes 15a, the fourth voltages to the second electrodes 16a, and the fifth voltages to the third electrodes 18a. The difference between the fourth voltages and the fifth voltages are the deflection voltages. The deflection voltages produce a uniform electric field (not shown) between the first substrate 11a and the second substrate 12a. The uniform electric field makes the liquid crystal molecules 13a rotate at the same angle, i.e., all liquid crystal molecules 13a have the same rotation angle and hence the same refractive index. As such, the difference in refractive index between the deflected liquid crystal molecules 13a and the spacers 14a may be within a predetermined range. The predetermined range refers to that the difference of refractive index between the liquid crystal molecules 13a and the spacers 14a is less than 0.1.

As shown in FIG. 9, when the light emitted from the display panel 2a passes through the liquid crystal molecules 13a and the spacers 14a, no or insignificant refraction occurs around the spacers 14a. Thus, the disclosed embodiments may solve the problem in the conventional technology. As shown in FIG. 3, when the stereoscopic display device is used to display 2D images, no voltage is supplied to the liquid crystal lenses 1' and hence no electric field is applied to the liquid crystal molecules 13', causing substantial difference in refractive index between the liquid crystal molecules 13' and the spacers 14'. The light emitted from the display panel 2' is refracted by the spacers 14'. Bright spots surrounding the spacers 14' are visible to the viewer of the stereoscopic display device. In certain embodiments, when the stereoscopic display device is used to display 2D images, relatively small third voltages are supplied to the first electrodes 5a. The third, the fourth and the fifth voltages are coordinated to achieve the proper operation of the stereoscopic display device.

In certain embodiments, the fourth voltages may be the ground and the fifth voltages may be equal to the original voltage. The resulting deflection voltages make all liquid crystal molecules 13a in the liquid crystal layer rotate at the same angle such that the proper displaying of the 2D images by the stereoscopic display device is assured.

In certain embodiments, the third electrodes 18a may be either plane electrodes or closely arranged strip shaped electrodes.

Figure 10:
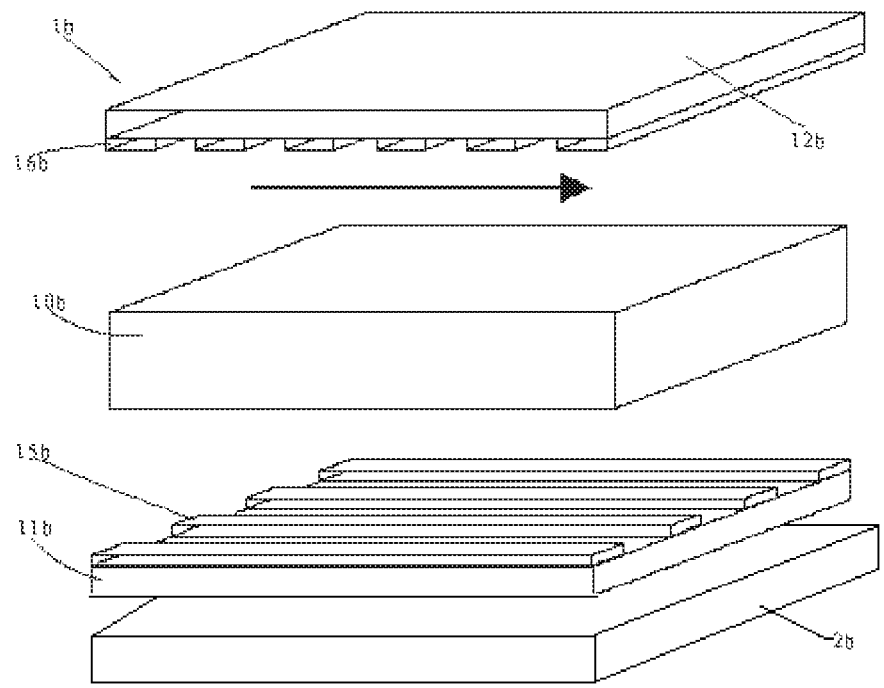
FIG. 10 illustrates another exemplary stereoscopic display device consistent with disclosed embodiments.

FIG. 10 illustrates another exemplary stereoscopic display device. As shown in FIG. 10, the stereoscopic display device may have a structure similar to previous embodiments. The alignment direction of the liquid crystal layer 10b is horizontal, which is perpendicular to the direction of the Earth gravity force vector. In addition, the angle between the extending direction of the second electrodes 16b and the alignment direction of the liquid crystal layer 10b is an acute angle.

Figure 11:
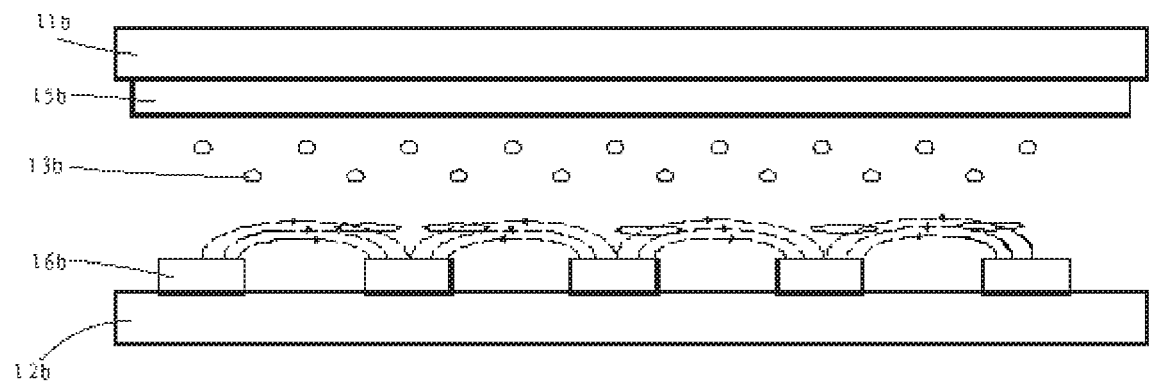
FIG. 11 illustrates a schematic view of the liquid crystal lenses in an exemplary stereoscopic display device consistent with disclosed embodiments.

As shown in FIG. 11, when the stereoscopic display device is used to display 2D images, the deflection voltages produce a horizontal or transverse electric field. The horizontal electric field makes the liquid crystal molecules 13b in the liquid crystal layer 10b rotate at various angles. Specifically, a plurality of first electrodes 15b is disposed on the first substrate 11b. A plurality of second electrodes 16b is disposed on the second substrate 12b. AC voltages with opposite phases and identical amplitudes are supplied to the adjacent second electrodes 16b. A common voltage is supplied to the first electrodes 15b. Thus, the horizontal electric field is produced between the adjacent second electrodes 16b. Because the liquid crystal molecules 13b close to the first substrate 11b and the second substrate 12b are subject to the weak electric field and the alignment force provided by the alignment layer (not shown) of the liquid crystal lenses 1b, the liquid crystal molecules 13b close to the first substrate 11b and the second substrate 12b rotate at a relatively small angle. Other liquid crystal molecules 13b are subject to the strong horizontal electric field and rotate at a relatively large angle.

Driven by the horizontal electric field, the liquid crystal molecules 13b rotate at various angles. The light emitted from the display panel 2b passes through the liquid crystal lenses 1b and is refracted differently by the liquid crystal molecules 13b rotated at different angles. As such, the difference in refractive index between the liquid crystal molecules 13b and the spacers 14b is reduced.

The difference in refractive index between the liquid crystal molecules 13b and the spacers 14b falls within a predetermined range. In one embodiment, the predetermined range refers to the difference in refractive index between the liquid crystal molecules 13b and the spacer 14b, which is less than 0.1. The bright spots surrounding the spacers 14b caused by the refraction of the light emitted from the display panel 2b are minimized, improving the viewing experience and display clarity when the stereoscopic display device is used to display 2D images.

Thus, the disclosed embodiments may solve the problem in the conventional technology. As shown in FIG. 3, when the stereoscopic display device is used to display 2D images, no voltage is supplied to the liquid crystal lenses 1' and hence no electric field is applied to the liquid crystal molecules 13', causing substantial difference in refractive index between the liquid crystal molecules 13' and the spacers 14'. The light emitted from the display panel 2' is refracted by the spacers 14'. Bright spots surrounding the spacers 14' are visible to the viewer of the stereoscopic display device.

As shown in FIG. 10, to assure the desired display effect when the stereoscopic display device is used to display 2D images, the extending direction of the first electrodes 15b and the extending direction of the second electrodes 16b form an angle. The deflection voltages produce a horizontal electric field between the first substrate 11b and the second substrate 12b. The horizontal electric field at the intersections of the first electrodes 15b and the second electrodes 16b is relatively strong. The liquid crystal molecules 13b around the intersections are rotated to align along the direction of the horizontal electric field.

In one embodiment, the direction of the electric field is perpendicular to the extending direction of the second electrodes 16b. The horizontal electric field away from the intersections is relatively weak. Subject to relatively weak electric field, the liquid crystal molecules 13b away from the intersections rotate at a relatively small angle. Thus, when the light emitted from the display panel 2b passes through the liquid crystal lenses 1b, the gradually changing rotation angles of the liquid crystal molecules 13b minimizes the bright spots surrounding the spacers 14b caused by the light refraction, improving the display quality of the stereoscopic display device.

In one embodiment, the spacers 14b are not required to locate at the positions of black matrices in the display panel 2b such that the manufacturing complexity of the liquid crystal lenses 1b is reduced.

Figure 12:
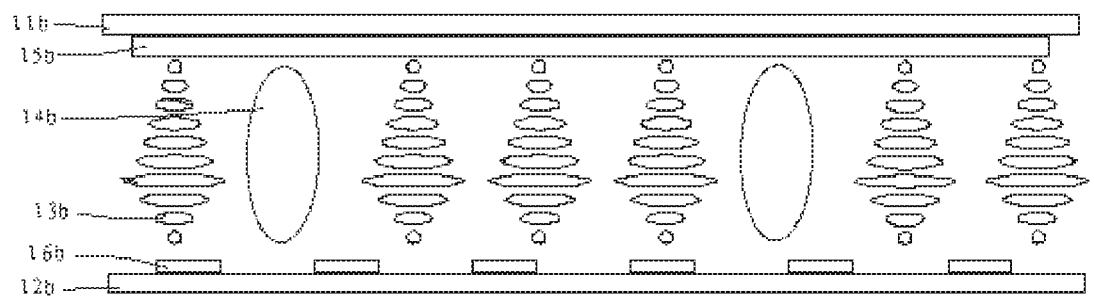
FIG. 12 illustrates a schematic view of the distribution in the liquid crystal layer in an exemplary stereoscopic display device consistent with disclosed embodiments.

As shown in FIG. 12, the deflection voltages produce a strong electric field at the intersections of the first electrodes 15b and the second electrodes 16b. The rotation angle of the liquid crystal molecules 13b in the strong electric field is $n_1$. The rotation angle of the liquid crystal molecules 13b away from the strong electric field is $n_2$, and $n_1 > n_2$. To assure the desired light separation when the stereoscopic display device is used to display 3D images, the extending direction of the first electrodes 15b and the extending direction of the second electrodes 16b are intersected to form intersection regions.

In the intersection regions, the deflection voltages produce a strong electric field. The liquid crystal molecules 13b surrounding the strong electric field are rotated to align along the direction of the electric field. In other words, such liquid crystal molecules 13b rotate at a relatively large angle. The liquid crystal molecules 13b away from the strong electric field rotate at a relatively small angle due to the weak electric field. In addition, the liquid crystal molecules 13b close to the first substrate 11b and the second substrate 12b are subject to the alignment force of the alignment layer, which limits the rotation angle.

Thus, the liquid crystal molecules 13b in the liquid crystal layer 10b rotate at various angles when subject to the horizontal electric field. As a result, the difference in refractive index between the liquid crystal molecules 13b and the spacers 14b is reduced. When the light emitted from the display panel 2b passes through the liquid crystal lenses 1b, the gradually changing rotation angles of the liquid crystal molecules 13b minimize the bright spots surrounding the spacers 14b caused by the light refraction, improving the display quality of the stereoscopic display device.

As shown in FIG. 11, the liquid crystal molecules 13b in the strong electric field rotate along a first direction. The first direction is perpendicular to the extending direction of the second electrodes 16b. Driven by the horizontal electric field, the liquid crystal molecules 13b in the liquid crystal layer 10b rotate at various angles such that the difference in refractive index between the liquid crystal molecules 13b and the spacers 14b falls within the predetermined range. When the light emitted from the display panel 2b passes through the liquid crystal lenses 1b, the gradually changing rotation angles of the liquid crystal molecules 13b minimize the bright spots surrounding the spacers 14b caused by the light refraction.

Thus, the disclosed embodiments may solve the problem in the conventional technology. As shown in FIG. 3, when the stereoscopic display device is used to display 2D images, no voltage is supplied to the liquid crystal lenses 1' and hence no electric field is applied to the liquid crystal molecules 13', causing substantial difference in refractive index between the liquid crystal molecules 13' and the spacers 14'. The light emitted from the display panel 2' is refracted by the spacers 14'. Bright spots surrounding the spacers 14' are visible to the viewer of the stereoscopic display device. Compared to the conventional technology, the disclosed embodiments may improve the viewing experience when the stereoscopic display device is used to display 2D images.

Figure 13:
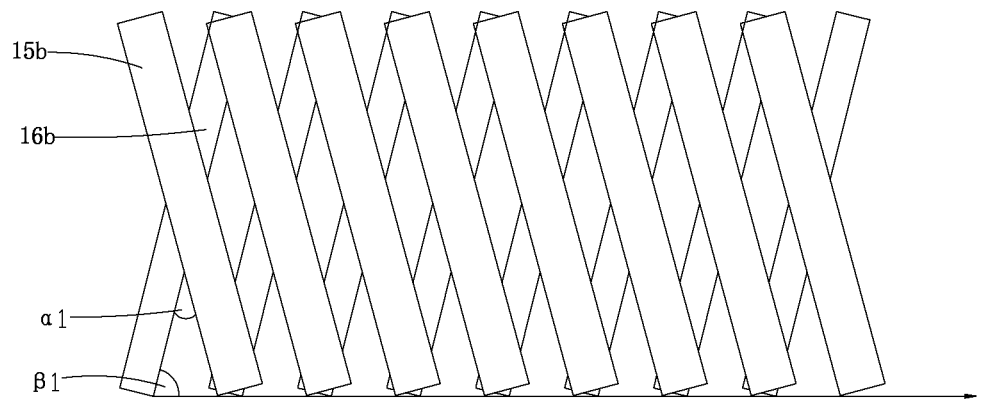
FIG. 13 illustrates intersections of the extending direction of second electrodes and the liquid crystal layer alignment direction consistent with disclosed embodiments.

As shown in FIG. 13, the angle between the extending direction of the first electrodes 15b and the extending direction of the second electrodes 16b is $\alpha_1$. In certain embodiments, $\alpha_1$ is an acute angle. The angle between the extending direction of the second electrodes 16b and the alignment direction of the liquid crystal layer 10b is $\beta_1$, and $45° \leq \beta_1 < 90°$. When $\beta_1 = 45°$, the angle between the extending direction of the second electrodes 16b and the alignment direction of the liquid crystal layer 10b is 45°. Driven by the horizontal electric field, the liquid crystal molecules 13b in the liquid crystal layer 10b rotate at various angles such that the difference in refractive index between the liquid crystal molecules 13b and the spacers 14b is reduced and the bright spots surrounding the spacers 14b caused by the light refraction are minimized. The selection of $\beta_1$ is related to the deflection voltages. When $\beta_1$ approaches either 0° or 90°, relatively large deflection voltages are needed. $\beta_1 = 45°$ or slightly greater than 45° is preferred to maintain a desired deflection voltages. Thus, the disclosed embodiments may minimize the effect of the spacers 14b to the image displaying and improves the viewing experience when the stereoscopic display device is used to display 2D images.

Alternatively, when $\beta_1 = 60°$, the angle between the extending direction of the second electrodes 16b and the alignment direction of the liquid crystal layer 10b is 60°. Driven by the horizontal electric field, the liquid crystal molecules 13b in the liquid crystal layer 10b rotate at various angles such that the difference in refractive index between the liquid crystal molecules 13b and the spacers 14b is reduced and the bright spots surrounding the spacers 14b caused by the light refraction are minimized. Thus, the disclosed embodiments may minimize the effect of the spacers 14b to the image displaying and improves the viewing experience when the stereoscopic display device is used to display 2D images. When determining the angle ca between the extending direction of the first electrodes 15b and the extending direction of the second electrodes 16b, considerations must be given to eliminate the moiré effect caused by the superposition to improve the display quality.

In one embodiment, the alignment direction of the liquid crystal layer 10b is horizontal. The control module supplies the first voltages to the first electrodes 15b and the second voltages to the second electrodes 16b. The difference between the first voltages and the second voltages are the deflection voltages. The deflection voltages produce the horizontal electric field between the first substrate 11b and the second substrate 12b. Because the angle between the extending direction of the second electrodes 16b and the alignment direction of the liquid crystal layer 10b is $\beta_1$, the liquid crystal molecules 13b in the liquid crystal layer 10b, driven by the horizontal electric field, rotate at various angles such that the difference in refractive index between the liquid crystal molecules 13b and the spacers 14b is reduced and the bright spots surrounding the spacers 14b caused by the light refraction are minimized. Thus, the disclosed embodiments may minimize the effect of the spacers 14b to the display quality and improves the viewing experience when the stereoscopic display device is used to display 2D images.

As shown in FIG. 12, the distance between two adjacent second electrodes 16b is greater than the width of the second electrodes 16b. This is desired for forming the horizontal electric field. Driven by the horizontal electric field, the liquid crystal molecules 13b are more likely to rotate at various angles. Thus, it is more likely to reduce the difference in refractive index between the liquid crystal molecules 13b and the spacers 14b. The disclosed embodiments may minimize the effect of the spacers 14b to the light emitted from the display panel 2b and improves the display quality.

Further, as shown in 12, the distance between two adjacent second electrodes 16b is L. The width of the second electrodes 16b is B, and $L \leq 10B$. Because of the need to maintain sufficient intensity of the horizontal electric field, the distance between two adjacent second electrodes 16b should not be greater than 10 times the width of the second electrodes 16*b* to assure that the liquid crystal molecules 13*b* in the strong horizontal electric field, driven by the strong horizontal electric field, rotate at a relatively large angle. This arrangement is desired for reducing the difference in refractive index between the liquid crystal molecules 13*b* and the spacers 14*b*, improving the display quality when the stereoscopic display device is used to display 2D images.

As shown in FIG. 11, when the stereoscopic display device is used to display 2D images, the first voltage is a common voltage. The second voltage is an AC voltage. Any two adjacent second electrodes 16*b* are supplied with two AC voltages with opposite phases and identical amplitudes. In other words, the control module supplies the common voltage to the first electrodes 15*b* and the AC voltages to the second electrodes 16*b*. The difference between the first voltages and the second voltages are the deflection voltages. The deflection voltages produce the strong electric field at the intersections of the first electrodes 15*b* and the second electrodes 16*b*. The liquid crystal molecules 13*b* rotate at a relatively large angle in the strong electric field and rotate at a relatively small angle away from the strong electric field.

For example, the liquid crystal molecules 13*b* close to the first substrate 11*b* and the second substrate 12*b* rotate at a relatively small angle. As a result, the liquid crystal layer 10*b* has gradually changing refractive indices, which further scatter and diffuse the light refracted by the spacers 14*b*, eliminate the bright spots surrounding the spacers 14*b* and improve the display quality when the stereoscopic display device is used to display 2D images.

As shown in FIG. 11, in one embodiment, the deflection voltages are greater than the threshold voltage $v_{th}$ of the liquid crystal molecules 13*b*. The deflection voltages produce the horizontal electric filed. The liquid crystal molecules 13*b* are driven by the horizontal electric field to rotate. The difference in refractive index between the liquid crystal molecules 13*b* and the spacers 14*b* is reduced. Thus, the light emitted from the display panel 2*b* and refracted by the spacers 14*b* is further scattered and diffused by the liquid crystal molecules 13*b*. Thus, the disclosed embodiments may solve the problem in the conventional stereoscopic display device as shown in FIG. 3, where the driving voltages are cut off from the liquid crystal lenses 1 when the stereoscopic display device is displaying 2D images, causing substantial difference in refractive index between the liquid crystal molecules 13' and the spacers 14' and subsequently bright spots surrounding the spacers 14' due to the refraction of the light emitted from the display panel 2'.

Figure 14:
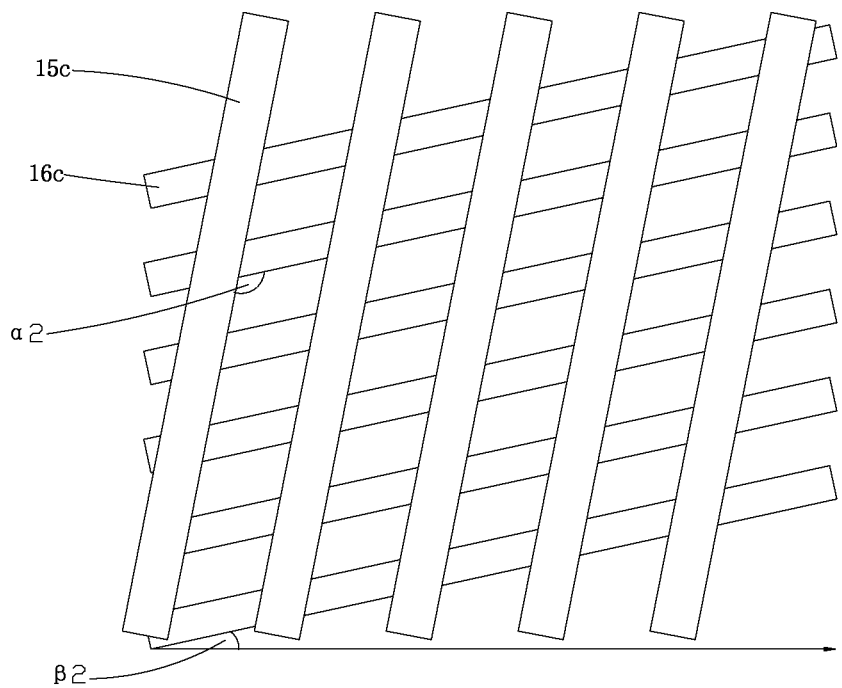
FIG. 14 illustrates intersections of the extending direction of second electrodes and the liquid crystal layer alignment direction consistent with disclosed embodiments.

FIG. 14 illustrates another electrode arrangement in the stereoscopic display device. As shown in FIG. 14, the angle between the extending direction of the first electrodes 15*c* and the extending direction of the second electrodes 16*c* is $\alpha_2$. In one embodiment, $\alpha_2$ is an obtuse angle. The angle between the extending direction of the second electrodes 16*c* and the alignment direction of the liquid crystal layer 10*c* is $\beta_2$, and $0° \leq \beta_2 < 45°$.

As shown in FIGS. 10 and 12, the alignment direction of the liquid crystal layer 10*b* is horizontal. When the stereoscopic display device is used to display 2D images, the voltage switching module switches the driving voltages to the deflection voltages. The deflection voltages produce a horizontal electric field between the first substrate 11*b* and the second substrate 12*b*. Because the angle between the extending direction of the second electrodes 16*c* and the alignment direction of the liquid crystal layer 10*b* is $\beta_2$, driven by the horizontal electric fields, the liquid crystal molecules 13*b* in the liquid crystal layer 10*b* rotate at various angles such that the difference in refractive index between the liquid crystal molecules 13*b* and the spacers 14*b* is reduced and the refraction of the light emitted from the display panel 2*b* by the spacers 14*b* is minimized. The disclosed embodiments may minimize the effect of the spacers 14*b* to the display quality and improves the viewing experience when the stereoscopic display device is used to display 2D images.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A stereoscopic display device, comprising:

a display panel for displaying 2D images and 3D images;

a driving circuit module; and a light-splitting device coupled to the display panel to separate light emitted from the display panel displaying the 3D images to effect 3D display effect in a 3D display mode and to pass through light emitted from the display panel in a 2D display mode, wherein the light-splitting device includes:

a first substrate having a plurality of first electrodes;

a second substrate arranged facing the first substrate and having at least one second electrode;

a liquid crystal layer placed between the first substrate and the second substrate and containing liquid crystal molecules; and a plurality of spacers placed between the first substrate and the second substrate and in the liquid crystal layer to support a thickness of the liquid crystal layer; and wherein the driving circuit module is configured to:

when in the 3D display mode, provide a plurality of driving voltages between the first electrodes and the second electrode to make the liquid crystal layer an array of liquid crystal lenses;

when in the 2D display mode, provide a deflection voltage between the first electrodes and the second electrode to reduce a refractive index difference between the liquid crystal molecules adjacent to a spacer and the spacer within a predetermined range, thereby reducing light refraction between the liquid crystal molecules and the adjacent spacer, wherein the predetermined range of the refractive index difference between the liquid crystal molecules adjacent to the spacer and the spacer is less than 0.1, wherein:

an alignment direction of the liquid crystal layer is horizontal;

an angle between an extending direction of the second electrode and the alignment direction of the liquid crystal layer is an acute angle;

in the 2D display mode, the deflection voltage produces a horizontal electric field between the first substrate and the second substrate; and an angle between the extending direction of the second electrodes and the alignment direction of the liquid crystal layer is 45° or slightly greater than 45° corresponding to a desired range of the deflection voltage for maintaining an electric field.

2. The stereoscopic display device of claim 1, further comprising:
a voltage module providing an initial voltage to the driving circuit module,
wherein the driving circuit module is configured to:
when in the 3D display mode, convert the initial voltage into the plurality of driving voltages; and
when in the 2D display mode, convert the initial voltage into the deflection voltage.

3. The stereoscopic display device of claim 1, wherein:
the deflection voltage is greater than a threshold voltage of the liquid crystal molecules and smaller than or equal to the initial voltage.

4. The stereoscopic display device of claim 1, wherein:
the refractive index difference between the liquid crystal molecules and the spacer is a difference between a refractive index of the liquid crystal molecules rotating at an angle under the deflection voltage and a refractive index of the adjacent spacer.

5. The stereoscopic display device of claim 1, wherein:
the first electrodes are strip-shaped electrodes arranged in parallel; and
the second electrode is a plane-shaped electrode.

6. The stereoscopic display device of claim 1, wherein:
the first electrodes are strip-shaped electrodes arranged in parallel; and
the at least one second electrode includes a plurality of strip-shaped electrodes arranged in parallel.

7. The stereoscopic display device of claim 2, wherein:
the driving circuit module includes a signal generation module and a voltage switching module; and
when in the 2D display mode, the signal generation module produces a control signal to control the voltage switching module to switch output of the driving circuit module from the driving voltages to the defection voltage.

8. The stereoscopic display device of claim 7, wherein:
the voltage switching module includes a switching unit; and
the switching unit receives the control signal to switch the driving voltages to the deflection voltage.

9. The stereoscopic display device of claim 8, wherein:
the voltage switching module includes a voltage adjusting unit;
the voltage adjusting unit is electrically connected in series to the output of the voltage module to adjust the driving voltages; and
the voltage adjusting unit is electrically connected in parallel to the switching unit.

10. The stereoscopic display device of claim 9, wherein:
the voltage switching module further includes a voltage regulating unit to regulate the driving voltages and the deflection voltage;
the voltage regulating unit is electrically connected in series to the voltage adjusting unit; and
outputs of the voltage regulating unit are electrically connected to the first electrodes and the second electrodes.

11. The stereoscopic display device of claim 7, further comprising a detection module, wherein:
the detection module is configured to detect whether a viewer is within a predetermined viewing range of the 3D display mode, and the predetermined viewing range refers to a plurality of discrete suitable viewing distances determined by a plurality of discrete light separation unit widths, and the viewer has a desired 3D viewing experience of the stereoscopic display device in the predetermined viewing range; and
when the viewer is not in the predetermined viewing range of the 3D display mode, the detection module sends a detection signal to the driving circuit module to generate the control signal for the 2D display mode.

12. The stereoscopic display device of claim 2, wherein:
when in the 2D display mode, the voltage module, through the driving circuit module, supplies a first voltage to the first electrodes and a second voltage to the second electrode; and
a difference between the first voltage and the second voltage is the deflection voltage.

13. The stereoscopic display device of claim 2, wherein:
the liquid crystal molecules in the liquid crystal layer rotate at various angles in the horizontal electric field.

14. The stereoscopic display device of claim 13, wherein:
the horizontal electric field at intersections of the first electrodes and the second electrode is a strong electric field;
a rotation angle of the liquid crystal molecules in the strong electric field region is $n_1$; and
a rotation angle of the liquid crystal molecules away from the strong electric field regions is $n_2$, $n_1 > n_2$.

15. The stereoscopic display device of claim 13, wherein:
the liquid crystal molecules in the strong electric field rotate at an angle toward a first direction; and
the first direction is perpendicular to the extending direction of the second electrode.

16. The stereoscopic display device of claim 13, wherein:
the first voltages are a ground;
the second voltages are AC voltages; and
any two adjacent second electrodes are supplied with two AC voltages with opposite phases and identical amplitudes.

17. The stereoscopic display device of claim 13, wherein:
an angle between the extending direction of the first electrodes and an extending direction of the second electrodes is $\alpha_1$, $\alpha_1$ being an acute angle.

* * * * *